US011251004B2

(12) United States Patent
Muir

(10) Patent No.: US 11,251,004 B2
(45) Date of Patent: Feb. 15, 2022

(54) VACUUM CIRCUIT INTERRUPTER WITH PIEZOELECTRIC ACTUATOR AND VACUUM CIRCUIT BREAKER INCORPORATING SAME

(71) Applicant: Camlin Technologies Limited, Lisburn Antrim (GB)

(72) Inventor: Mark Muir, Lisburn Antrim (GB)

(73) Assignee: Camlin Technologies Limited, Lisburn Antrim (GB)

( * ) Notice: Subject to any disclaimer, the term of this patent is extended or adjusted under 35 U.S.C. 154(b) by 476 days.

(21) Appl. No.: 16/099,708

(22) PCT Filed: May 8, 2017

(86) PCT No.: PCT/EP2017/060924
§ 371 (c)(1),
(2) Date: Nov. 8, 2018

(87) PCT Pub. No.: WO2017/194471
PCT Pub. Date: Nov. 16, 2017

(65) Prior Publication Data
US 2019/0198271 A1    Jun. 27, 2019

(30) Foreign Application Priority Data

May 10, 2016 (GB) .................................... 1608172

(51) Int. Cl.
*H01H 1/02* (2006.01)
*H01H 1/50* (2006.01)
(Continued)

(52) U.S. Cl.
CPC .......... *H01H 33/28* (2013.01); *H01H 1/0203* (2013.01); *H01H 1/502* (2013.01);
(Continued)

(58) Field of Classification Search
CPC ........ H01H 1/0203; H01H 1/502; H01H 3/22; H01H 33/28; H01H 33/664;
(Continued)

(56) References Cited

U.S. PATENT DOCUMENTS 4,547,086 A   10/1985   Matsumoto et al.
4,570,095 A   2/1986    Uchikawa
(Continued)

FOREIGN PATENT DOCUMENTS

DE   10017178 A1   10/2001
JP   H0367419 A    3/1991
WO   2015112796 A1  7/2015

OTHER PUBLICATIONS

United Kingdom Search Report for Application No. GB1608172.1 dated Nov. 11, 2016.
(Continued)

*Primary Examiner* — William A Bolton
(74) *Attorney, Agent, or Firm* — Warner Norcross + Judd LLP

(57) ABSTRACT

A vacuum circuit breaker comprises a vacuum interrupter operable between a closed state and an open state, and an actuator. The actuator comprises a piezoelectric driving element that is expandable and contractable along an expansion axis in response to an electrical input signal. The actuator further comprises a mechanical amplifying structure extendable along an actuation axis and being mechanically coupled to the piezoelectric driver such that expansion or contraction of said piezoelectric driving element causes the amplifying structure to extend or retract along the actuation axis. The mechanical amplifying structure is coupled to the vacuum interrupter for operating the vacuum interrupter between said closed and open states.

18 Claims, 9 Drawing Sheets

(51) Int. Cl.
*H01H 3/22* (2006.01)
*H01H 33/28* (2006.01)
*H01H 33/664* (2006.01)
*H01H 33/666* (2006.01)
*H01H 57/00* (2006.01)
*H02N 2/04* (2006.01)

(52) U.S. Cl.
CPC ............ *H01H 3/22* (2013.01); *H01H 33/664* (2013.01); *H01H 33/666* (2013.01); *H01H 33/6642* (2013.01); *H01H 57/00* (2013.01); *H02N 2/043* (2013.01); *H01H 2033/6648* (2013.01); *H01H 2221/072* (2013.01)

(58) Field of Classification Search
CPC ............ H01H 33/6642; H01H 33/666; H01H 2221/072; H01H 71/127; H01H 57/00; H01H 2057/003; H01H 2057/006; H02N 2/043
USPC .................. 310/328, 311, 314, 323, 367
See application file for complete search history.

(56) References Cited

U.S. PATENT DOCUMENTS

| | | | |
|---|---|---|---|
| 4,808,874 A * | 2/1989 | Stahlhuth | H02N 2/043 310/328 |
| 4,976,553 A | 12/1990 | Yamaguchi et al. | |
| 5,270,984 A | 12/1993 | Mine | |
| 5,729,077 A * | 3/1998 | Newnham | H02N 2/043 310/328 |
| 6,294,859 B1 | 9/2001 | Jaenker | |
| 6,597,086 B1 * | 7/2003 | Boecking | H01L 41/0472 310/328 |
| 6,731,048 B2 * | 5/2004 | Kawazoe | F02M 47/027 310/328 |
| 6,927,528 B2 * | 8/2005 | Barillot | H02N 2/043 310/325 |
| 8,324,785 B2 * | 12/2012 | Chen | H02N 2/043 310/328 |
| 2003/0137218 A1 | 7/2003 | Hermle et al. | |
| 2009/0145734 A1 | 6/2009 | Ehrlich | |
| 2010/0320870 A1 | 12/2010 | Rahman et al. | |
| 2012/0217845 A1 | 8/2012 | Rahman et al. | |
| 2016/0049575 A1 * | 2/2016 | Fathi | H02N 2/043 310/328 |

OTHER PUBLICATIONS

International Search Report from PCT/EP2017/060924 dated Nov. 15, 2017.
Written Opinion from PCT/EP2017/060924 dated Nov. 15, 2017.

* cited by examiner

VACUUM CIRCUIT INTERRUPTER WITH PIEZOELECTRIC ACTUATOR AND VACUUM CIRCUIT BREAKER INCORPORATING SAME

FIELD OF THE INVENTION

This invention relates to vacuum circuit breakers, vacuum circuit interrupters and to actuators for operating same.

BACKGROUND TO THE INVENTION

A vacuum circuit breaker (VCB) normally comprises a vacuum circuit interrupter and an actuator for operating the interrupter between open and closed states. Conventionally, the actuator comprises an electromagnetic device coupled to the contacts of the interrupter by bellows, the electromagnetic actuator and the bellows being located outside of the vacuum enclosure that contains the interrupter. Such VCBs are large, relatively slow to operate and relatively difficult to control precisely. Also, the bellows are prone to failure.

It would be desirable to provide an improved vacuum circuit breaker, and in particular an improved vacuum interrupter and actuator.

SUMMARY OF THE INVENTION

A first aspect of the invention provides a vacuum circuit breaker comprising a vacuum interrupter operable between a closed state and an open state, and an actuator, wherein said actuator comprises a piezoelectric driving element that is expandable and contractable along an expansion axis in response to an electrical input signal, and wherein said actuator further comprises a mechanical amplifying structure extendable along an actuation axis and being mechanically coupled to said piezoelectric driver such that expansion or contraction of said piezoelectric driving element causes said amplifying structure to extend or retract along said actuation axis, said mechanical amplifying structure being coupled to said vacuum interrupter for operating said vacuum interrupter between said closed and open states.

A second aspect of the invention provides an actuator comprising a piezoelectric driving element that is expandable and contractable along an expansion axis in response to an electrical input signal; and a mechanical amplifying structure extendable along an actuation axis and being mechanically coupled to said piezoelectric driver such that expansion or contraction of said piezoelectric driving element causes said amplifying structure to extend or retract along said actuation axis A third aspect of the invention provides a vacuum interrupter comprising first and second electrical contacts, said first contact being movable with respect to said second contact to effect open and closed states, at least one of, preferably both of, the first and second contacts being incorporated into a respective contact assembly of which the respective electrical contact provides a contact surface that engages with the contact surface of the other electrical contact when the contacts are in the closed state, the respective contact assembly further comprising a contact carrier which carries the respective electrical contact at one end, the contact carrier being formed from an electrically conductive material and being electrically connected to the respective contact and comprising a hollow structure.

A fourth aspect of the invention provides an actuator comprising a piezoelectric driving element that is expandable and contractable along an expansion axis in response to an electrical input signal, wherein at least two electrodes are embedded in said piezoelectric driving element and are connected, or are connectable, to an electrical load for sinking energy generated in said piezoelectric driver by the piezoelectric effect.

A fifth aspect of the invention provides a vacuum interrupter comprising first and second electrical contacts, said first contact being movable with respect to said second contact to effect open and closed states, at least one of, preferably both of, the first and second contacts being incorporated into a respective contact assembly of which the respective electrical contact provides a contact surface that engages with the contact surface of the other electrical contact when the contacts are in the closed state, wherein a magnetic shield or condenser is provided around the or each contact assembly.

A sixth aspect of the invention provides a vacuum interrupter comprising first and second electrical contacts, at least one of said electrical contacts being formed from a primary refractory material and a secondary refractory material capable of acting as a non-evaporable getter, preferably titanium.

Preferably said expansion axis is perpendicular to said actuation axis.

Preferably said amplifying structure comprises a body shaped and dimensioned to define a cavity in which said piezoelectric driver is located. Said body is preferably sleeve like in shape.

Preferably said body has first and second sides spaced apart in a transverse direction between which said piezoelectric driver is located such that said expansion axis runs in said transverse direction, said piezoelectric driver engaging with said sides.

In preferred embodiments said body has a first flexible structure extending between first and second sides of the body defining the top of said cavity, said flexible structure being flexible in the direction of said actuation axis to effect extension and contraction of said actuator. Typically said first and second sides are movable with respect to each other in said transverse direction, said first flexible structure being configured to flex in the direction of said actuation axis in response to relative movement of said sides in said transverse direction. Preferably said first flexible structure is responsive to movement apart of said first and second sides to flex away from said cavity to effect extension of said actuator, and is responsive to movement towards of said first and second sides to flex towards said cavity to effect contraction of said actuator.

Typically said first and second sides are movable by expansion and contraction of said piezoelectric driver along said transverse axis.

In preferred embodiments, the flexible structure comprises at least one set of first and second rigid segments, each segment having one end coupled to a respective one of said sides by a respective hinge, the respective other end of each segment being coupled together by an intermediate segment that allows the first and second segments to pivot with respect to each other about an axis that runs parallel with the first and second sides. Each hinge preferably comprises a flexure bearing.

Said intermediate segment preferably comprises a structure to which the respective end of each of the first and second segments is coupled by a respective hinge, preferably comprising a flexure bearing. Said intermediate segment typically forms part of a coupling between said actuator and said vacuum interrupter for operating the vacuum interrupter.

Preferably the flexible structure comprises first and second sets of said first and second segments, the sets being stacked such that the first set is located between the second set and the cavity. Typically the respective other end of each segment of each set is coupled to a common intermediate segment.

Advantageously, the respective hinge that couples the respective one end of the respective first and second segments of the second set to the respective first or second side is stiffer than the corresponding hinge of the second set. Said respective hinges preferably comprise a respective flexure bearing, the flexure bearings of said second set being thicker than the flexure bearings of said first set.

In preferred embodiments said body has a second flexible structure extending between first and second sides of the body defining the bottom of said cavity. Said second flexible structure is preferably the same as the first flexible structure.

Preferably said piezoelectric driver is located in said cavity such that a gap is defined between said piezoelectric driver and said first flexible structure.

Advantageously the piezoelectric driver is offset in the cavity in the direction of the actuation axis such that it is closer to the bottom of the cavity than it is to the first flexible structure.

Optionally a thermal compensating component is provided at each of said first and second sides for engaging with the piezoelectric driver.

In preferred embodiments the vacuum circuit breaker comprises a housing in which said actuator and vacuum interrupter are located, wherein the actuator is coupled to the vacuum interrupter by a flexible coupling member that extends across the housing between the actuator and the vacuum interrupter, the actuator being coupled to the flexible member such that extension and contraction of the actuator causes the flexible member to flex correspondingly along said actuation axis. Preferably the flexible coupling member is non-resilient.

Typically said vacuum interrupter comprises first and second electrical contacts, said first contact being movable with respect to said second contact to effect said open and closed states, wherein said flexible coupling member is electrically connected to the first contact. Preferably, said actuator is electrically, and preferably also thermally, isolated from the flexible member.

In preferred embodiments said vacuum interrupter comprises first and second electrical contacts, said first contact being movable with respect to said second contact to effect said open and closed states, at least one of, preferably both of, the first and second contacts being incorporated into a respective contact assembly of which the respective electrical contact provides a contact surface that engages with the contact surface of the other electrical contact when the contacts are in the closed state, the respective contact assembly further comprising a contact carrier which carries the respective electrical contact at one end, the contact carrier being formed from an electrically conductive material and being electrically connected to the respective contact and comprising a hollow structure.

Preferably said hollow structure is a spring-like structure capable of resiliently compressing and decompressing along the contact movement axis. Said hollow structure is preferably a helical spring structure. The contact carrier may compress resiliently upon engagement of the contacts and decompresses during opening of the contacts.

Advantageously, a magnetic focussing element is located inside the said hollow structure, the magnetic focusing element typically comprising a block of ferromagnetic material. Preferably the focussing element is dimensioned and located to leave a gap between itself and the respective electrical contact when the contact carrier is in a relatively uncompressed state, and to contact the respective electrical contact when the contact carrier is in a relatively compressed state, and in particular a relatively compressed state caused by engagement of said first and second electrical contacts. Said contact carrier may be configured to adopt said relatively uncompressed state during opening of said first and second contacts, preferably before said first and second contacts are separated.

In preferred embodiments, a magnetic shield, or magnetic condenser, is provided around the or each contact assembly. Said shield preferably comprises a sleeve-like structure formed from a ferromagnetic material.

Preferably, the shield is located adjacent but spaced from the outside surface of the or each contact carrier, preferably extending parallel with said outside surface. Optionally the shield is electrically connected to one or other of said electrical contacts.

In preferred embodiments at least two electrodes are embedded in said piezoelectric driver.

Said at least two electrodes preferably comprise first and second multi-terminal electrodes, preferably arranged such that the electrode terminals are spaced apart along the length of the piezoelectric driver in the direction of the expansion axis, and wherein preferably the respective terminals of the first electrode being interleaved with the terminals of the second electrode.

Typically said at least two electrodes are connected, or are connectable, to an electrical power supply for applying said electrical input signal to said piezoelectric driver.

Advantageously said at least two electrodes are connected, or are connectable, to an electrical load for sinking energy generated in said piezoelectric driver by the piezoelectric effect.

Conveniently the same electrodes are selectably connectable to said power supply or said electrical load.

In preferred embodiments aid at least two electrodes are connectable to or connected to a four quadrant electrical power supply that is operable in a first mode in which it applies said electrical input voltage to said piezoelectric driver via said electrodes, and a second mode in which it acts as an electrical load for sinking energy generated in said piezoelectric driver by the piezoelectric effect via said electrodes.

In preferred embodiments said vacuum interrupter comprises first and second electrical contacts, at least one of said electrical contacts being formed from a primary refractory material and a secondary refractory material capable of acting as a non-evaporable getter. The secondary refractory material preferably comprises titanium.

By way of example, embodiments of the invention may comprise or include a piezoelectric actuated interrupter, capable of withstanding and breaking currents up to 21 kA, yet being compact enough to fit into an existing NH2 DIN blade fuse position and can carry loads of up to 400 A.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
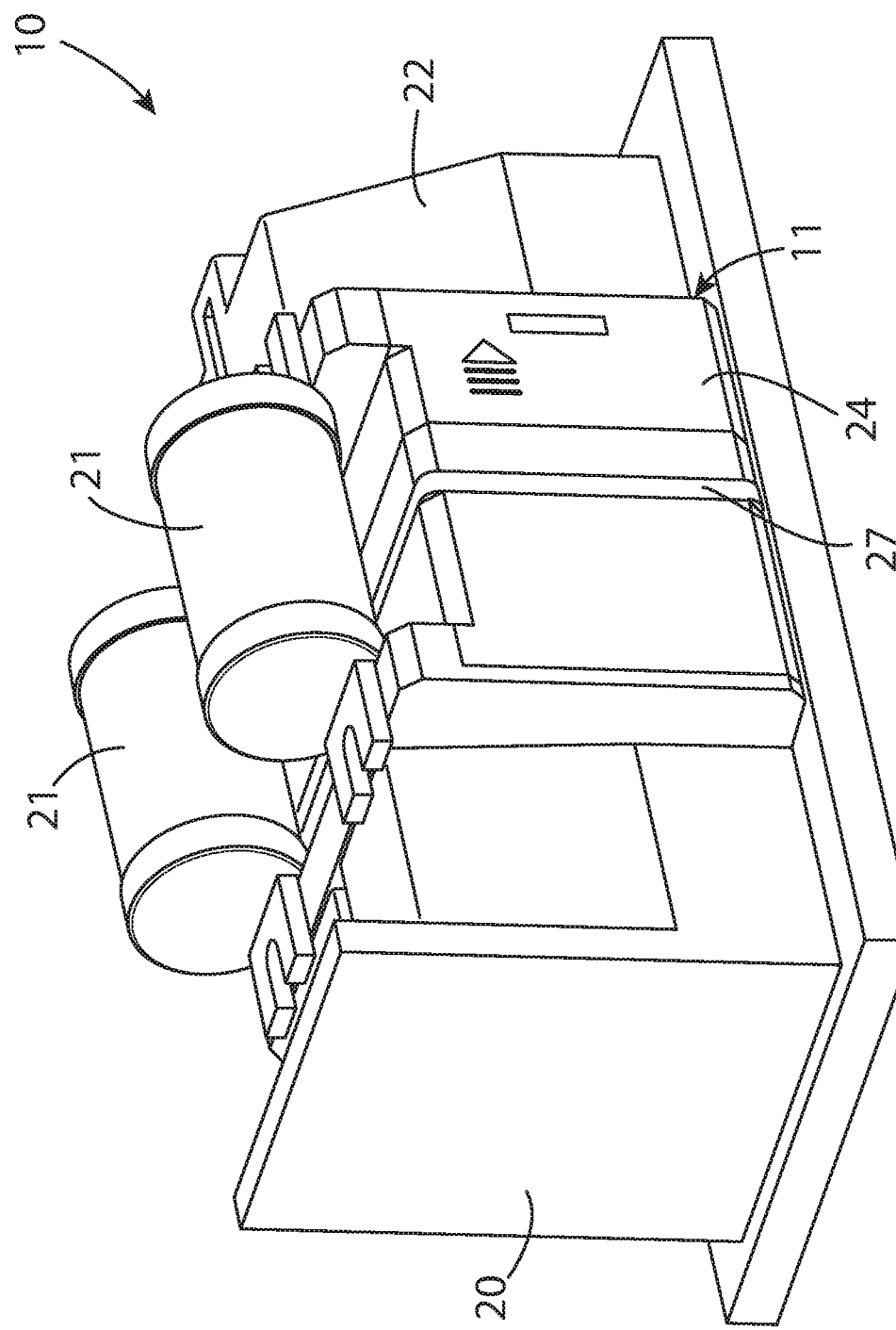
FIG. 1 is an isometric view of a vacuum circuit breaker (VCB) embodying one aspect of the invention.
Figure 2:
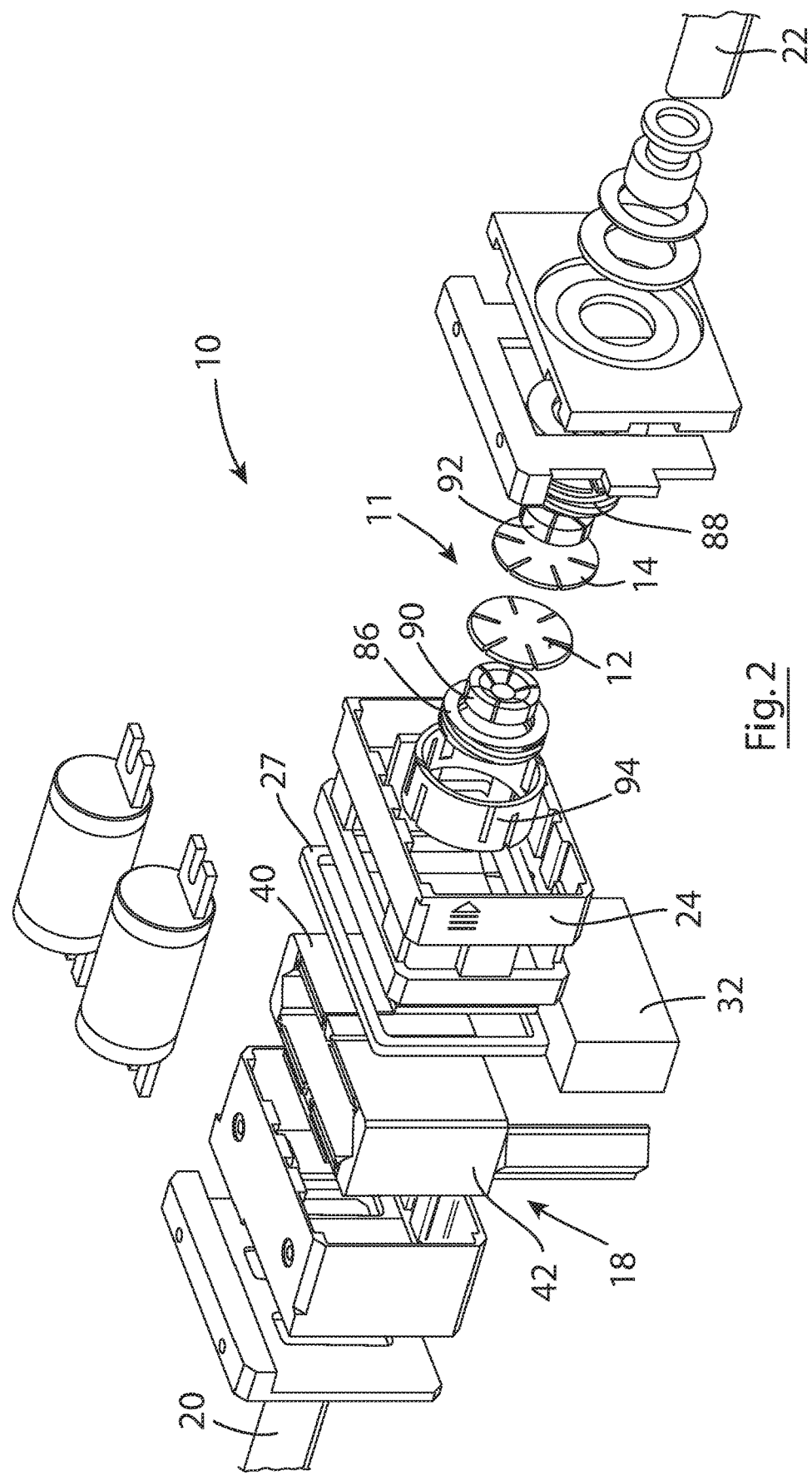
FIG. 2 is an exploded isometric view of the VCB of FIG. 1.
Figure 3:
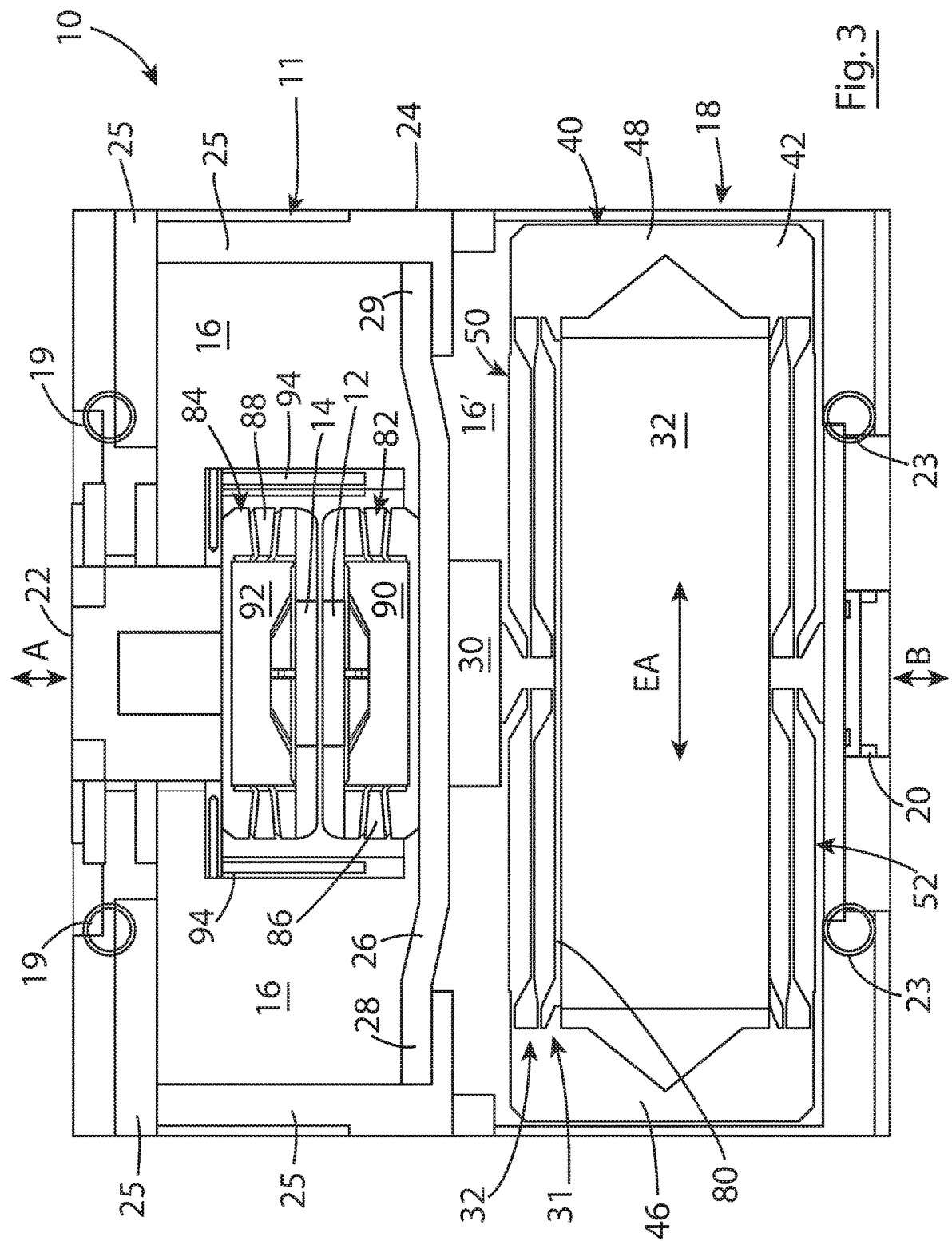
FIG. 3 is a sectional side view of a vacuum circuit interrupter and actuator assembly embodying another aspect of the invention and suitable for use in the VCB of FIG. 1.

Referring now in particular to FIGS. 1 to 3 of the drawings, there is shown, generally indicated as 10 an electrical circuit breaker device embodying one aspect of the invention. The preferred device 10 is intended for use in breaking an AC electrical power supply (in particular at low voltages (LV)) and so may be referred to as an AC circuit breaker. The circuit breaker 10 comprises a vacuum interrupter 11 and as such may be referred to as a vacuum circuit breaker (VCB). The vacuum interrupter 11, which embodies another aspect of the invention, comprises first and second electrical contacts 12, 14, are located in a vacuum chamber 16, i.e. a chamber that is hermetically sealed and in vacuum, at least during use. The first contact 12 is movable between an open state and a closed state in which it makes electrical contact with the second contact 14. The open state of the contact 12 corresponds to the open, or breaking, state of the vacuum interrupter 11, and correspondingly of the circuit breaker 10, in which it interrupts current flow. The closed state of the contact 12 corresponds to the closed, or making, state of the vacuum interrupter 11, and correspondingly of the circuit breaker 10, in which current is able to flow between the contacts 12, 14.

Movement of the contact 12 between its open and closed states is effected by an actuator 18, which is advantageously a piezoelectric actuator embodying a further aspect of the invention, as is described in further detail hereinafter.

The vacuum interrupter 11, and therefore the VCB 10, may operate in a normally closed state, i.e. with the contact 12 in its closed state to allow current to flow between the contacts 12, 14 and so to flow in any given circuit (not shown) in which the circuit breaker 10 is installed during use. In such cases the VCB 10 is configured to open automatically in response to detection of a fault condition, e.g. in response to detection of a current overload or short circuit, to protect the circuit into which it is incorporated during use. It achieves this by causing the actuator 18 to move the first contact 12 to its open state in response to detection of the fault. To this end the VCB 10 includes a controller (not shown) for effecting the open state upon detection of a fault. The controller typically comprises electrical and/or electronic circuitry that includes, or is connected to, one or more current sensors (not shown). The current sensor(s) are coupled in use to any convenient current conductor of the VCB 10 or circuit to which the VCB is connected. Upon detection of current, more particularly prospective current, above a threshold level by the sensor(s), the controller causes the VCB to open. In preferred embodiments this is achieved by adjusting the voltage applied to the piezoelectric actuator 18. The controller does not typically open the contacts immediately upon detection of overcurrent, advantageously it monitors voltage and/or phase angle to determine a suitable opening instant, e.g. at the zero crossing point of the sinusoidal voltage signal (which typically has a frequency of 50-60 Hz).

In some embodiments, the VCB 10 can be reset, i.e. closed, manually or semi-manually (e.g. by manual activation of a user control (not shown)) and/or automatically in response to the VCB 10 detecting that the fault has gone, and/or after a threshold period of time has expired since activation. In preferred embodiments, this is achieved by adjusting the voltage applied to the piezoelectric actuator 18. Circuit breakers that reset automatically are commonly known as reclosers.

Alternatively, vacuum interrupter 11, and therefore the VCB 10, may operate in a normally open state, i.e. with the contact 12 in its open state to prevent current from flowing between the contacts 12, 14.

In preferred embodiments, the vacuum interrupter 11 is configured to adopt the open state in the event of a power failure to the device 10. In particular, in the absence of an electrical input signal being applied to the piezoelectric actuator 18, the actuator 18 is configured to cause the contacts 12, 14 to open or to remain open as applicable.

The VCB 10 includes first and second external electrical terminals 20, 22 that are electrically connected, respectively, to the first and second internal contacts 12, 14, and by which the VCB 10 may be electrically (and mechanically) connected to the circuit that it is desired to protect in use. In FIG. 2, the terminals 20, 22 are shown as comprising blade type terminals (not visible in FIG. 1). Optionally, one or more fuses 21 are connected between the terminals 20, 22 to provide back-up protection in the event that the contacts 12, 14 fail to open or in the event that, even when open, the spacing of the contacts does not interrupt the current.

Referring now in particular to FIG. 3, the VCB 10 comprises a housing 24 that defines the vacuum chamber 16 in which the vacuum interrupter 11 is located. The housing 24 may be formed from any suitable material(s).

Advantageously, the piezoelectric actuator 18 is also located within the housing 24. In preferred embodiments, the actuator 18 is located in the vacuum chamber 16. In alternative embodiments (not illustrated) the actuator 18 may be located in a chamber that is separate from the vacuum chamber 16 and which may or may not be in vacuum. In either case, the actuator 18 is mechanically coupled to the vacuum interrupter 11 in order to move the first contact 12 between its open and closed state. The first contact 12 is movable along an axis A which in preferred embodiments corresponds to the longitudinal axis of the VCB 10. The actuator 18 is operable to extend and contract along an actuation axis (shown by arrow B in FIG. 3) and is preferably positioned such that said actuation axis is aligned with the axis A (preferably the actuation axis and axis A are the same axis but they may alternatively be parallel with one another). Extension and contraction of the actuator 18 causes the contact 12 to move along axis A between its closed and open states. The preferred arrangement is such that extension of the actuator 18 along its actuation axis is transmitted to the contact 12 to move the contact 12 along axis A towards and into its closed state. Contraction of the actuator 18 along its actuation axis is transmitted to the contact 12 to move the contact 12 along axis A out of the closed state into its open state. In alternative embodiments, the arrangement may be such that extension of the actuator causes the contacts to open, while contraction of the actuator causes them to close. This arrangement may be implemented by suitable configuration of the mechanical coupling between the actuator and the movable contact.

The first contact 12 is electrically connected to the first terminal 20 of the VCB 10. The second contact 14 is electrically connected to the second terminal 22 of the VCB 10. The terminals 20, 22 are conveniently provided at opposite ends of the housing 24 and may each comprise a blade type terminal (not shown in FIG. 3) or a mounting for a blade type terminal.

In preferred embodiments, the mechanical coupling between the actuator 18 and the vacuum interrupter 11 comprises a flexible coupling member 26 that extends across the inside of the housing 24 between the actuator 18 and the vacuum interrupter 11. The preferred flexible member 26 is planar in form, e.g. comprising a sheet, plate or membrane, but it may alternatively take other forms, e.g. comprising a bar, strip or rod. In the illustrated embodiment, the flexible member 26 separates the inside of the housing 24 into first and second chambers 16, 16', the vacuum interrupter 11 being in the first chamber 16 and the actuator 18 being in the other. Both chambers 16, 16' may be in vacuum but there is typically a pressure differential between them. The ends 28, 29 of the flexible member 26 may be fixed to opposite sides of the housing 24 in any convenient manner.

The actuator 18 is coupled to the flexible member 26 such that extension and contraction of the actuator 18 causes the flexible member 26 to flex correspondingly upwards and downwards as viewed in FIG. 3. Preferably the flexible member 26 is non-resilient, e.g. has substantially no resilience or a low resilience, to provide little or no resistance to being flexed. This may be achieved by appropriate selection of the material from which the flexible member 26 is made and/or its thickness and/or its shape. The contact 12 is coupled to the flexible member 26 such that its flexing is transmitted into corresponding movement of the contact 12 along axis A.

In preferred embodiments, the flexible member 26 is electrically connected to the first contact 12 and the first terminal 20 of the VCB 210 and serves as an electrical conductor for carrying electrical current between the first contact 12 and the electrical terminal 20 during use. To this end, the flexible member 26 is formed wholly or partly from an electrically conductive material, or may include an electrical conductor. For example, the flexible member 26 may be a metal, e.g. copper, sheet, membrane or strip. In the illustrated embodiment, the one or more walls 25 of chamber 16 is also formed from an electrically conductive material, or includes an electrical conductor, for carrying current to and from the flexible member 26. In this example, an electrical connection is made between a first fuse terminal 29 and the flexible member 25 via wall 25. A respective fuse 21 is connected between the first fuse terminal 21 and a second fuse terminal 23 to electrically connect the contact 12 with the terminal 20 via the fuse 21, the wall 25 and the flexible member 26. An electrical isolating component 27, e.g. an isolator ring, is provided between the chambers 16, 16' to isolate the walls of chamber 16' from walls of chamber 16.

The actuator 18 is electrically, and preferably also thermally, isolated from the flexible member 26. In preferred embodiments, an electrical and thermal isolator 30 couples the actuator 18 to the flexible member 26, and may for example comprise one or more blocks or layers of electrical and/or thermally isolating material(s).

Referring now in particular to FIGS. 4 to 7, the preferred piezoelectric actuator 18 is described. The actuator 18 comprises a piezoelectric driving element 32 and an amplifier 40. The piezoelectric element 32 comprises a block of piezoelectric material, e.g. piezoelectric crystal, that is expandable along an expansion axis EA (sometimes called the $d_{33}$ axis) in response to the application of electric voltage. The preferred piezoelectric driver 32 comprises a stack of layers of piezoelectric material (the layers running along the $d_{33}$ axis). Any suitable conventional piezoelectric material may be used, for example lead zirconate titanate, e.g. PZT-5H Navy type VI or PIC 252 (PI). In preferred embodiments, the stack comprises one or more co-fired multilayer ceramics. It is also preferred that the piezoelectric driver 32 is operable in a bipolar or semi-bipolar manner. As such, the piezoelectric driver 32 expands along the expansion axis EA in response to the application of voltage of one polarity (e.g. a positive voltage in this example) and contracts along the expansion axis EA in response to the application of voltage of the opposite polarity (e.g. a negative voltage in this example). Typically, the piezoelectric driver 32 has an equilibrium length (in the direction of the axis EA) that it adopts in the absence of an applied voltage, increases this length in response to the application of voltage of the relevant polarity and returns to the equilibrium length in the absence of such voltage. The preferred piezoelectric drive 32 contracts from the equilibrium length upon application of voltage of the opposite polarity and returns to the equilibrium length in the absence of such voltage. Advantageously, the speed at which the piezoelectric driver 32 returns to the equilibrium length can be increased by applying a voltage of the opposite polarity to that which caused it to expand or contract as applicable. For example, in the present example, application of a positive voltage causes the piezoelectric driver 32 to expand along axis EA and, when in an expanded state, application of a negative polarity voltage causes the driver 32 to contract more quickly than just the absence of a voltage. In any event, it will be understood that by adjusting the voltage applied to the piezoelectric driver 32 it may be caused to expand and contract along the expansion axis EA, wherein the voltage adjustment may involve adjusting the magnitude and/or polarity of the applied voltage.

Figure 4:
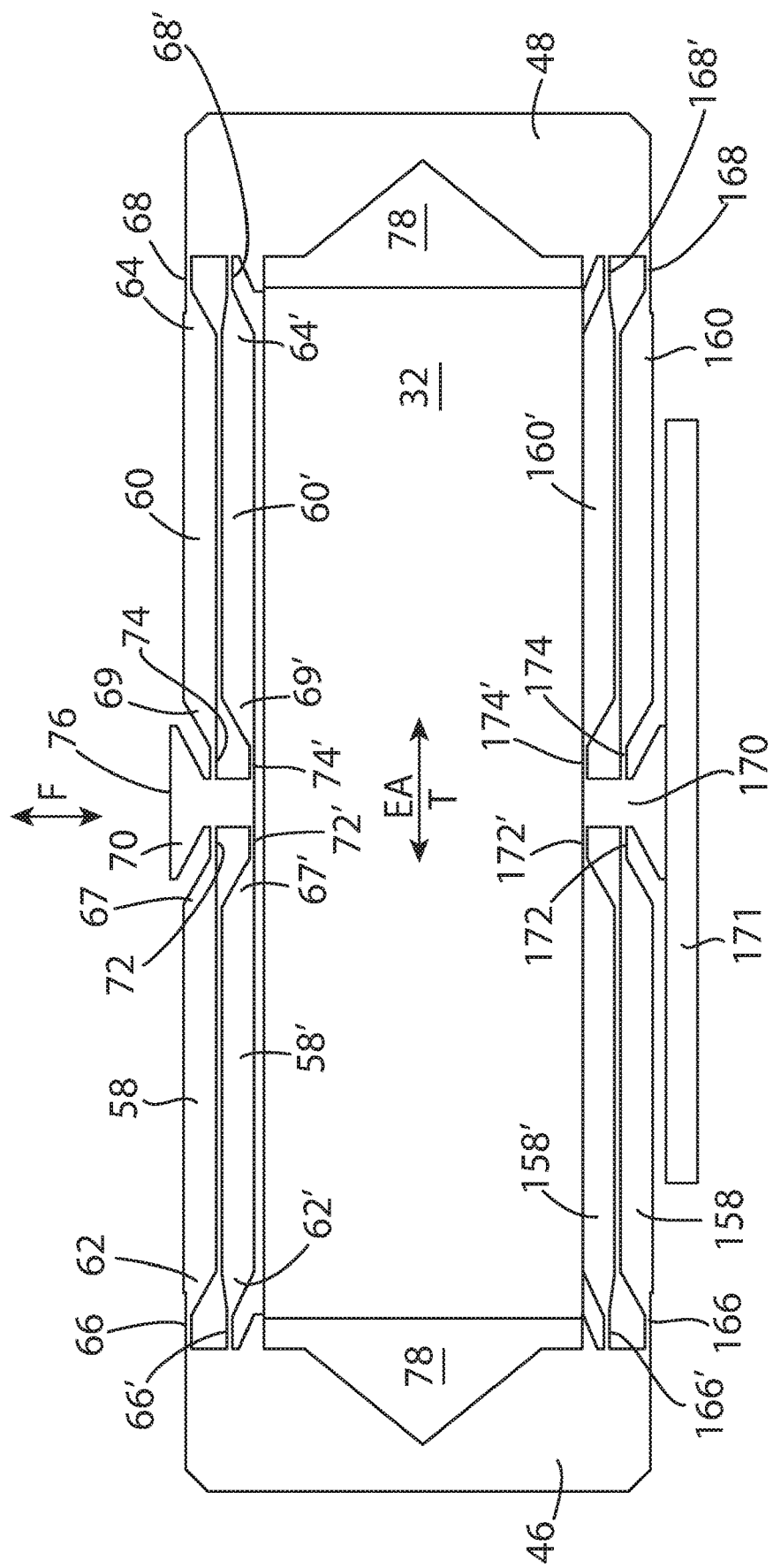
FIG. 4 is a sectional side view of a preferred piezoelectric actuator embodying another aspect of the invention and suitable for use in the assembly of FIG. 3.
Figure 5:
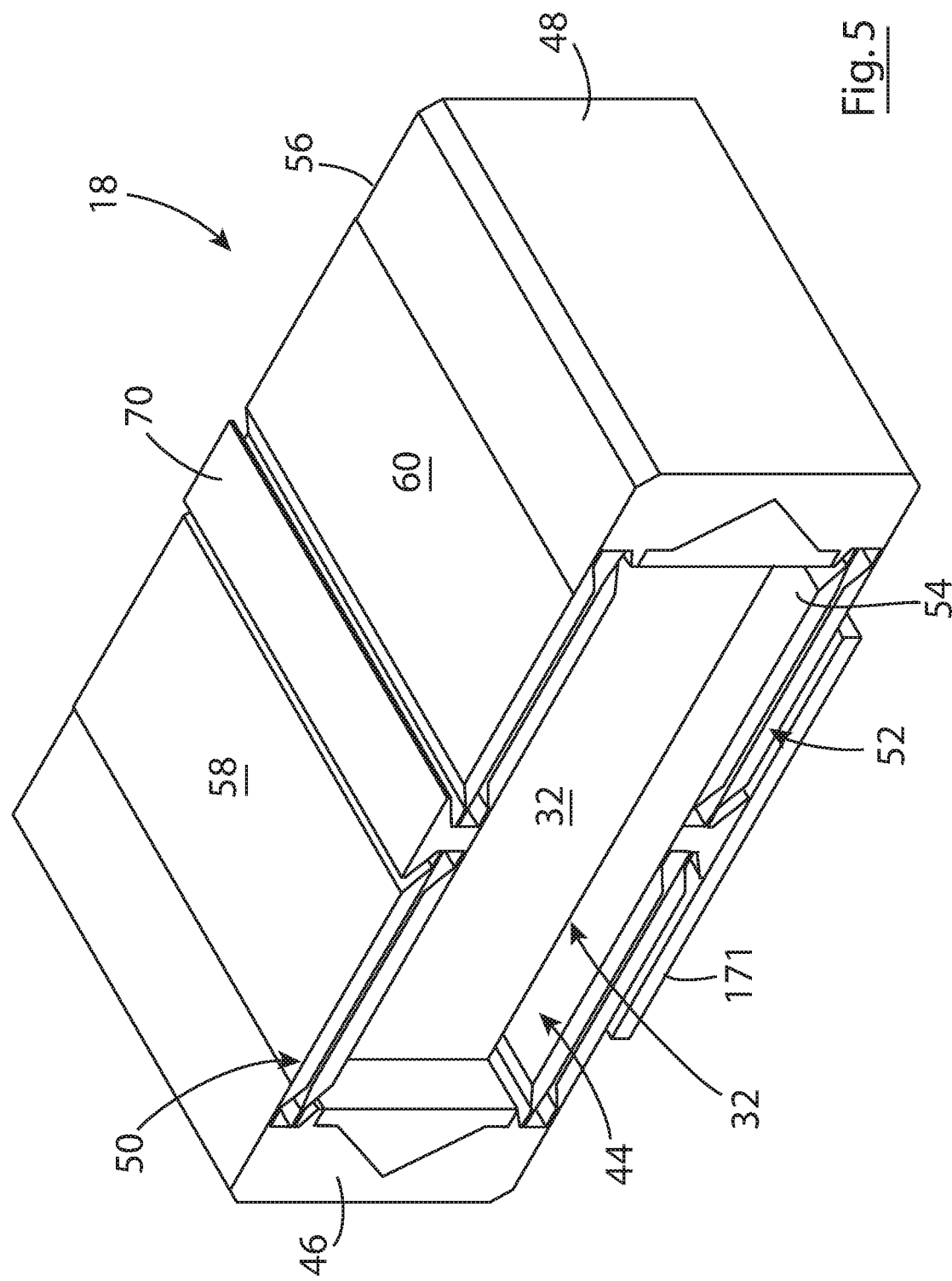
FIG. 5 is a perspective view of the actuator of FIG. 4.
Figure 6:
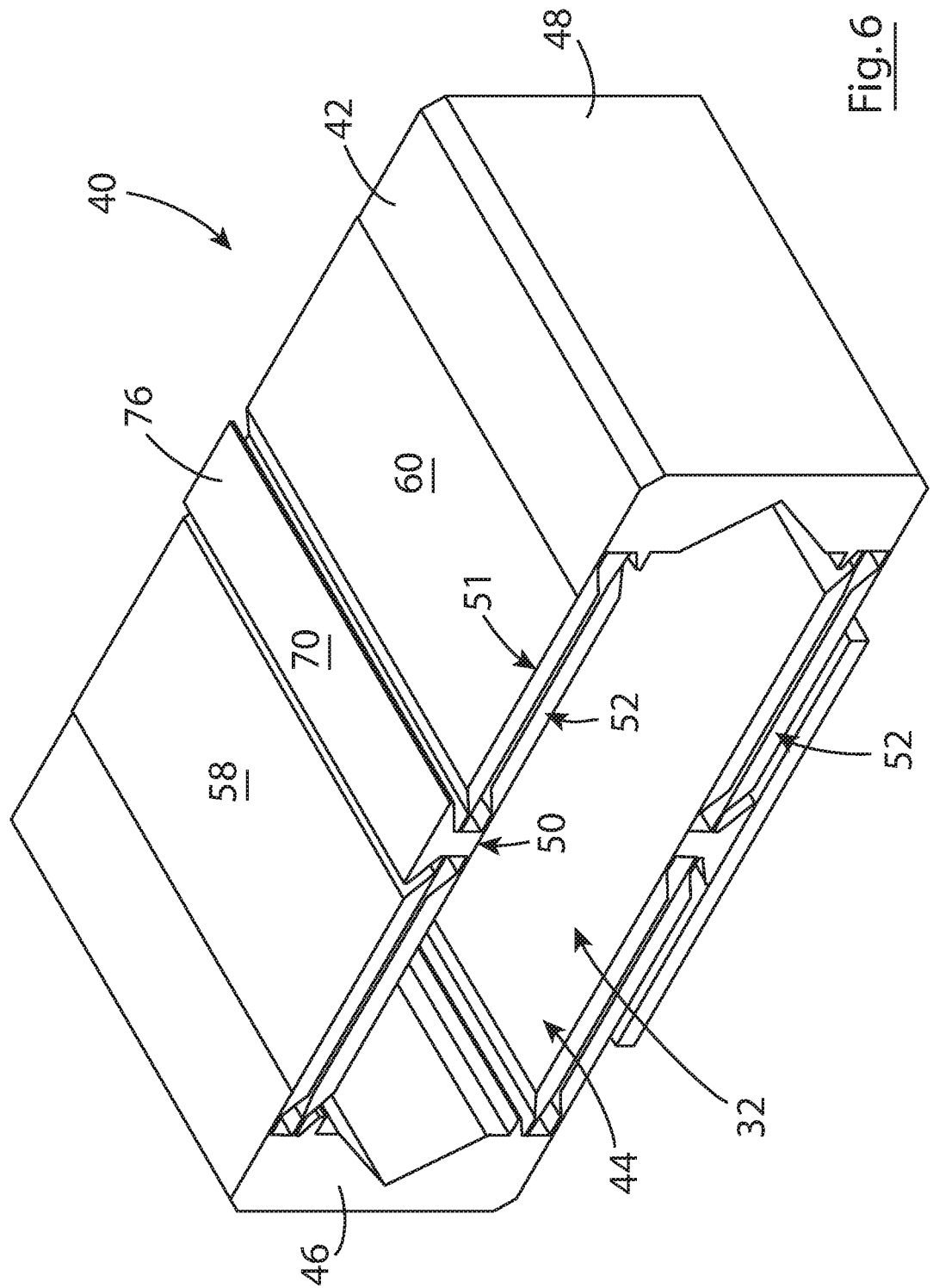
FIG. 6 is a perspective view of an amplifier component of the piezoelectric actuator of FIG. 4.
Figure 7:
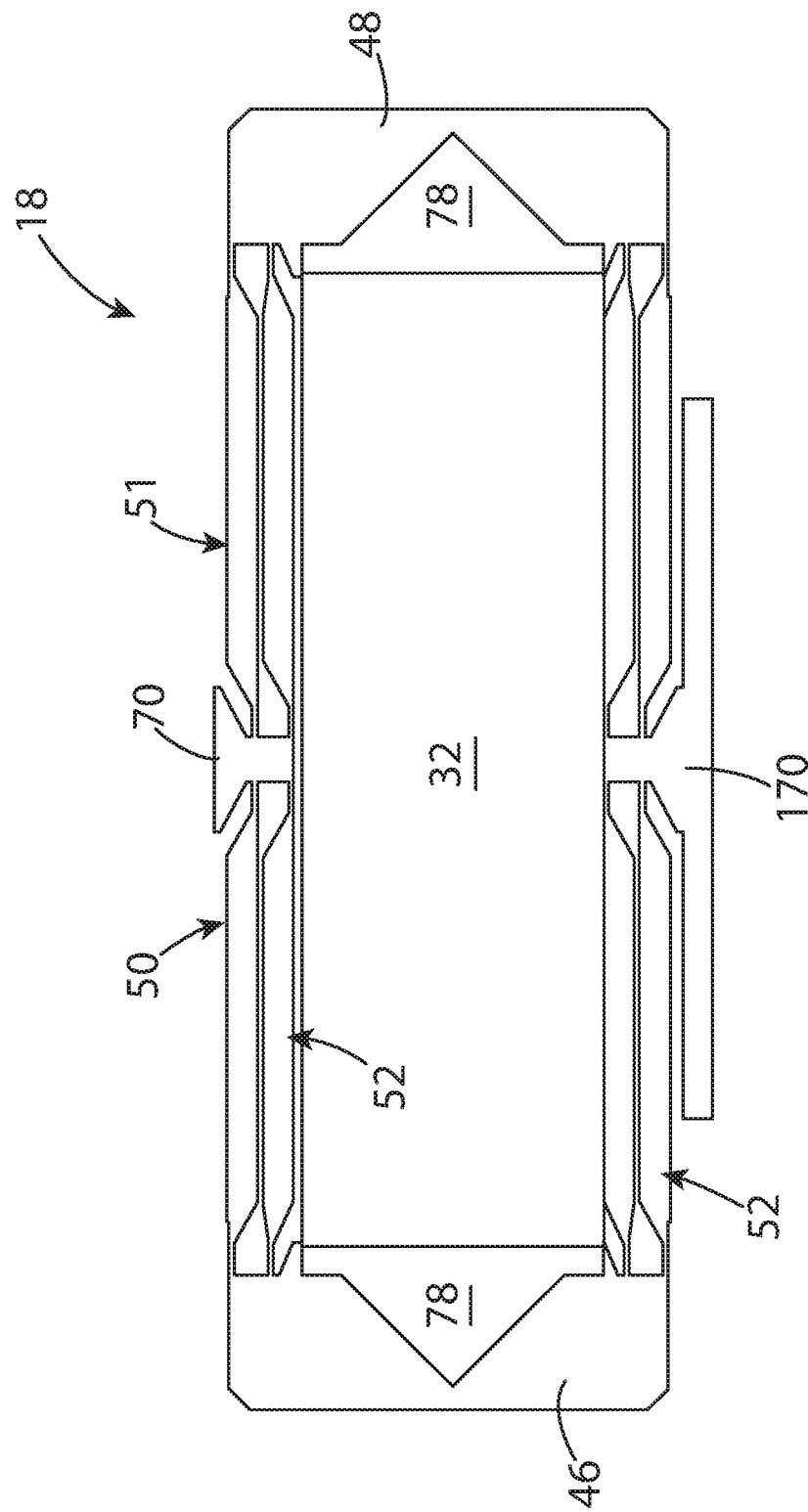
FIG. 7 is a sectional side view of the piezoelectric actuator of FIG. 4 shown in an expanded state.
Figure 9C:
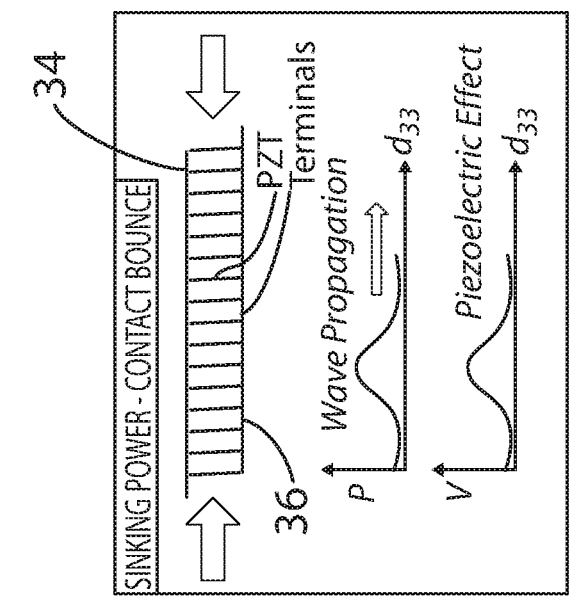
FIG. 9C is a schematic illustration of energising terminals for the piezoelectric element in a power sink mode.
Figure 9B:
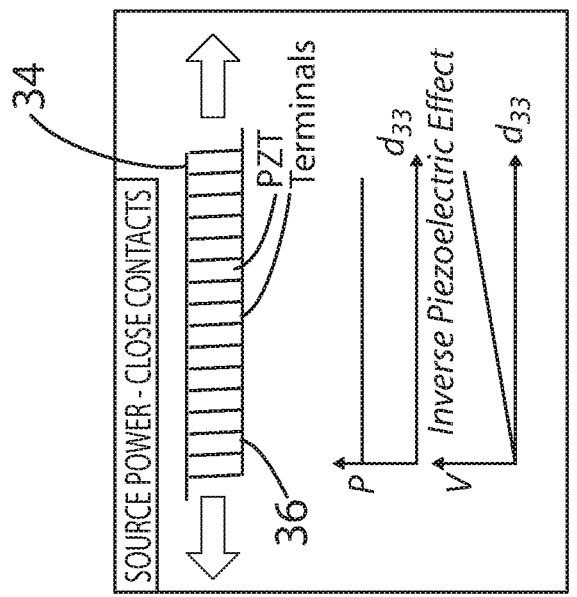
FIG. 9B is a schematic illustration of energising terminals for the piezoelectric element in a power source mode.

Electrodes are provided for applying an electrical input signal to the piezoelectric driver 32 (not shown in FIG. 4). Typically at least two electrodes are provided (at least one positive and one negative). FIGS. 9B and 9C provide a schematic representation of a first multi-terminal electrode 34 and a second multi-terminal electrode 36 that may be used to apply voltages to the piezoelectric driver 32. It is preferred that the electrodes are embedded in the piezoelectric material but may alternatively be electrically connected to the driver 32 in any other convenient manner. In preferred embodiments where multi-terminal electrode(s) are used, it is preferred that the terminals are spaced apart along the length of the piezoelectric driver (preferably in the direction of the expansion axis EA), and, where both the electrodes 34, 36 have multiple terminals, it is preferred that the respective terminals are interleaved with one another (e.g. as illustrated in FIGS. 9B and 9C). In use, application of voltage to the driver 32 changes the electric field applied to the piezoelectric material which in turn determines the relative expansion or contraction of the material.

By way of example, in a typical embodiment, the piezoelectric driver 32 may have a length (in the direction EA) of approximately 65 mm, a height of approximately 33 mm and a width of approximately 20 mm. Depending on the applied voltage, the driver 32 may expand or contract along the EA axis by up to approximately 0.1% of its length. The applied voltage range may be for example −125 V to +500 V. In such an example, the peak electric field strength at maximum expansion may be approximately +2 $kVmm^{-1}$. Where semi-bipolar operation is supported, the peak electric field strength at maximum contraction may be approximately −500 $Vmm^{-1}$. Typically piezoelectric layer thickness may be approximately 250 μm. The piezoelectric block 32 is typically substantially cuboid in shape but may take other shapes as suits the embodiment.

An advantage of using a piezoelectric driver 32 is the speed and precision at which its expansion and contraction can be controlled compared to, say, a conventional electromagnetic actuator. However, the amount by which the piezoelectric driver 32 expands and contracts is relatively small for its size. The purpose of the amplifier 40 is to mechanically amplify the expansion/contraction of the piezoelectric driver 32 so that the displacement effected by the actuator 18 is larger than the expansion/contraction of the driver 32. This allows the piezoelectric actuator 18 to be small enough to be used, for example, in a VCB suitable for a range of applications. Advantageously, the mechanical amplifier 40 allows the speed and precision of the driver 32 to be maintained as characteristics of the actuator 18 itself.

The amplifier 40 comprises a body 42 shaped and dimensioned to define a cavity 44 for receiving the piezoelectric driver 32. The body 42 comprises first and second spaced apart sides 46, 48. A first flexible structure 50 extends between and is supported by the sides 46, 48. A second structure 52, which is preferably a flexible structure, extends between the sides 46, 48 spaced apart from the first structure 50. The arrangement is such that the cavity 44 is located between the sides 46, 48 and between the first and second structures 50, 52. The first flexible structure 50 may be said to form the top or roof of the cavity. The second structure 52 may be said to provide the bottom of the cavity. The body 42 has first and second ends 54, 56 (not visible) that are preferably open such that the body 42 is sleeve-like in shape. The open ends 54, 56 are defined by respective ends of the sides 46, 48 and structures 50, 52. In typical embodiments the body 42 is substantially rectangular in longitudinal and transverse cross-section.

The body 42 has a transverse axis T that runs from side 46 to side 48. The first flexible structure 50 is flexible in a direction F that is perpendicular to the axis T (and perpendicular to the end-to-end direction of the body) and which corresponds to the actuation axis of the actuator 18. In preferred embodiments, the second structure 52 is also flexible in the direction F, although in alternative embodiments, the second structure may not be flexible.

When the piezoelectric driver 32 is located in the cavity 44, it is positioned such that its expansion axis EA runs from side-to-side of the body, i.e. substantially along the axis T. The piezoelectric driver 32 is dimensioned such that it exerts a force on the sides 46, 48 of the body 42 the magnitude of which depends on the relative state of expansion/contraction of the driver 32. In particular, expansion of the driver 32 increases the force on the sides 46, 48 while contraction reduces the force on the sides 46, 48. The first and second flexible structures 50, 52 allow movement of the sides 46, 48 along the axis T, i.e. towards and away from one another. Hence application of force to the sides 46, 48 as the piezoelectric driver 32 expands moves or tends to move the sides 46, 48 away from one another. The body 42 has an equilibrium state, for example as shown in FIG. 4, which it adopts in the absence of any forces being applied by the driver 32 (and assuming that it is at rest). When the driver 32 expands, the sides 46, 48 move apart. As is described in more detail below, this causes the flexible structure 50 to flex in the direction F away from the driver 32 (as shown for example in FIG. 7). When the force applied by the driver 32 reduces to allow the sides 46, 48 to move back towards their equilibrium positions, the flexible structure 50 flexes in the direction F towards the driver 32. In preferred embodiments the second flexible structure 52 flexes away from and towards the driver in the same manner.

Flexure of the flexible structures 50, 52 towards and away from the piezoelectric driver 32 effects extension and contraction, respectively, of the actuator 18 along its actuation axis. When coupled to the vacuum interrupter 11, this moves the contact 12 between its closed and open states as described above. When the piezoelectric driver 32 expands, the distance by which the flexible structures 50, 52 move away from their equilibrium position is greater than the distance that the sides 46, 48 move away from their equilibrium position, i.e. the expansion of the driver 32 is mechanically amplified by the amplifier 40. The amount of the amplification depends, in part, on the length of the flexible structures 50, 52 and their angle of inclination with respect to the axis EA.

In preferred embodiments, the flexible structure 50 comprises at least one set of first and second segments 58, 58'; 60, 60' each segment having one end 62, 62'; 64, 64' coupled to a respective one of the sides 46, 48 by a respective hinge 66, 66'; 68, 68'. Each hinge 66, 66'; 68, 68' preferably comprises a flexure bearing, particularly a living hinge, i.e. integrally formed with the side 46, 48 and the segment 58, 58'; 60, 60'. In any event, the hinges 66, 66'; 68, 68' allow the respective segments 58, 58'; 60, 60' to pivot about an axis that runs parallel with the sides, i.e. perpendicular to both the transverse axis T and the flexing axis F. The respective other ends 67, 67'; 69, 69' of each segment 58, 58'; 60, 60' are coupled together by an intermediate segment 70 that allows the segments 58, 58'; 60, 60' to pivot with respect to each other about an axis that runs parallel with the sides, i.e. perpendicular to both the transverse axis T and the flexing axis F. This has the effect of allowing the intermediate segment 70 to move up and down as viewed in FIGS. 4 and 7, i.e. away from and towards the piezoelectric driver 32 during use.

In preferred embodiments, the intermediate segment 70 comprises a structure to which the respective end 67, 67'; 69, 69' of each of the first and second segments 58, 58'; 60, 60' is coupled by a respective hinge 72, 72'; 74, 74'. Each hinge 72, 72'; 74, 74' preferably comprises a flexure bearing, particularly a living hinge, i.e. integrally formed with the intermediate segment 70 and the respective first or second segment 58, 58'; 60, 60'. The hinges 72, 72'; 74, 74' allow the respective segments 58, 58'; 60, 60' to pivot with respect to the intermediate portion 70 about an axis that runs parallel with the sides, i.e. perpendicular to both the transverse axis T and the flexing axis F. Conveniently, the intermediate segment 70 may be used to impart the movement generated by the actuator 18 to whatever it is desired to actuate. In the present embodiment this is the contact 12 and so the intermediate segment 70 is coupled to the contact 12 via the isolator 30 and the flexible coupling member 26. Preferably comprises an abutment surface 76 for engaging with, in this example, the isolator 30.

In alternative embodiments (not illustrated), the intermediate segment may comprise just a hinge that joins the ends 67, 67'; 69, 69' of the first and second segments together. The hinge preferably comprises a flexure bearing, particularly a living hinge, i.e. integrally formed with the first and second segments 58, 58'; 60, 60'.

In preferred embodiments, the intermediate segment 70 is located mid-way between the sides 46, 48 such that the length of the first and second segments 58, 58'; 60, 60' from the respective side 46, 48 to the intermediate segment 70 is substantially the same. The preferred arrangement is such that the flexible structure 50 is symmetrical about the flexing axis F.

In preferred embodiments, the first and second segments 58, 58'; 60, 60' each comprises a planar or plate-like structure hinged along opposite sides to the respective side 46, 48 and the intermediate portion 70 respectively. Typically, the first and second segments 58, 58'; 60, 60' are dimensioned to extend from end 54 to end 56 of the body 42. The intermediate portion 70 may comprise an elongate structure, typically extending from end 54 to end 56 of the body 56. For example in preferred embodiments (as illustrated) the intermediate portion 70 comprises a beam, although in alternative embodiments it may just consist of a hinge. Typically, the first flexible structure 50 provides a face (the top face in the illustrated example) of the body 42, extending between the sides 46, 48 with the cavity 44 underneath.

In alternative embodiments (not illustrated) the first and second segments 58, 58'; 60, 60' may take other forms, for example comprising one or more bars or beams extending between the sides 46, 48 and the intermediate portion.

The first and second segments 58, 58'; 60, 60' are rigid, at least to the extent that they have a fixed length between the respective side 46, 48 and the intermediate segment 70. This rigidity, in combination with the parallel hinges (one at the respective side 46, 48 and one at the intermediate segment 70 for each segment 58, 58'; 60, 60') causes the intermediate segment 70 to move away from the cavity 44 (upwards as viewed in the drawings) when the sides 46, 48 move apart, and towards the cavity 44 (downwards as viewed in the drawings) when the sides 46, 48 move towards each other. The rigidity also facilitates efficient transmittal of the driver 32 movement to the intermediate segment 70.

In preferred embodiments, the flexible structure 50 comprises first and second sets S1, S2 of the first and second segments 58, 58'; 60, 60' described above. The sets are stacked (but preferably spaced apart as opposed to being in contact with one another) such that the first set S1 is located underneath the second set S2, i.e. such that the first set S1 is located between the second set S2 and the cavity 44. The preferred arrangement is such that the respective first and second segments and hinges of each set S1, S2 are in register with each other in the axial direction F (e.g. such that corresponding hinges of each set run parallel with one another, advantageously in register in the direction F). Conveniently, each set S1, S2 is coupled to a common intermediate section 70, although in alternative embodiments a respective intermediate section may be provided for each set. In any event, the arrangement is such that the sets S1, S2 flex simultaneously, in the manner described above, in response to movement of the sides 46, 48 towards or away from one another. The provision of multiple, stacked sets improves the flexible structure's 50 ability to withstand the relatively high stresses and strains that occur when generating high forces at high speed without unduly compromising the flexing movement of the structure 50.

The respective hinges 66, 68 at each side 46, 48 for the first set S1 are spaced apart in the direction F from the corresponding hinges 66', 68' of the second set S2. Advantageously, the hinges 66', 68' of the second set S2 are stiffer (i.e. more resistant to pivoting movement of the respective first and second segment) than the corresponding hinges 66, 68 of the first set S1. In preferred embodiments where the hinges comprise flexure bearings, this is achieved by making the hinges 66', 68' of the second set S2 thicker than the hinges 66, 68 of the first set S1. This improves the ability of the flexible structure 50 to withstand stresses and strains without unduly comprising its responsiveness to expansion/contraction of the piezoelectric driver 32.

Preferably, the spacing of the corresponding hinges 66, 66'; 68, 68' in the direction F is such that a gap is defined between the respective corresponding first and second segments 58, 58'; 60, 60'.

Typically, the respective first and second segments of each set are all of substantially the same thickness. Typically, the respective hinges 72, 72'; 74, 74' that couple the first and second segments to the intermediate segment 70 are of the same thickness (or stiffness). The thickness of the first and second segments and of the hinges may be selected to suit the application, typically to balance the responsiveness of the flexible structure 50 against its ability to handle stress/strain.

In alternative embodiments, the flexible structure 50 may comprise just one set, or more than two stacked sets, of first and second segments and associated hinges.

In preferred embodiments, the second flexible structure 52 is the same or substantially the same as the first flexible structure 50, and the same description applies as provided above unless otherwise indicated. As such, the preferred second flexible structure comprises at least one set of first and second segments 158, 158'; 160, 160' each segment having one end 162, 162'; 164, 164' coupled to a respective one of the sides 46, 48 by a respective hinge 166, 166'; 168, 168', and to in intermediate segment 170 by a respective hinge 172, 172'; 174, 174'. Typically, the intermediate segment 170 is fixed to a base 171, which in use is at a fixed location (e.g. fixed to the housing 24 in the present example). The second flexible structure 52 contributes to the overall distance through which the intermediate section 70 of the first flexible structure 50 is movable as the piezoelectric drive 32 expands and contracts. In alternative embodiments, the lower (as viewed) face of the body 42 may be formed by some other structure other than the flexible structure 52, preferably one that allows movement of the sides 46, 48 towards and away from one another.

In preferred embodiments the body 42, or at least the sides 46, 48 and flexible structure(s) 50, 52, is formed from the same material, e.g. steel, titanium or other metal or metal alloy, for example using electro discharge machining.

Optionally, a thermal compensating component 78 is provided at each side 46, 48 of the body 42 within the cavity 44 for engaging with the piezoelectric driver 32, i.e. providing a surface at each side of the cavity 44 with which the driver 32 engages. The thermal compensating component 78 is formed from a material having a relatively high coefficient of thermal expansion (CTE), e.g. aluminium, and is preferably triangular in end-to-end cross-section. It is formed from a different material than the rest of the amplifier body 42, which is typically formed from relatively low CTE material.

Movements of the driver 32 and the body 42 that can arise as a result of thermal expansion are compensated for by using the high CTE materials in the compensating component 78 to balance the CTE of the driver 32 along the expansion axis EA in preferred embodiments, and the low CTE materials typically used for the rest of the amplifier 40.

In preferred embodiments, the piezoelectric driver 32 substantially fills the cavity 44, at least in the direction of its expansion axis EA, i.e. from side 46 to side 48, such that the driver 32 maintains contact with the sides 46, 48 in the equilibrium state but also as the driver 32 expands and contracts. The piezoelectric driver 32 may be bonded to the sides 46, 46, e.g. using UHV epoxy.

Preferably, the piezoelectric driver 32 is located and dimensioned such that a gap 80 is defined between the driver 32 and the first flexible structure 50. The gap 80 facilitates movement of the flexible structure 50 towards the driver 32 with respect to its equilibrium position, and in particular movement that may be caused by the momentum of the first flexible structure 50 as it moves towards the driver 32 during use. The gap 80 may be wide enough to prevent the flexible structure 50 impacting on the driver 32, although this is not essential. The piezoelectric driver 32 may rest on the second flexible structure 52 (or other lower structure defining the bottom of the cavity 44). Alternatively, the piezoelectric driver 32 is located and dimensioned such that a gap (not shown) is defined between the driver 32 and the second flexible structure 52 (or other bottom structure), although such a gap is preferably narrower than the gap 80. In preferred embodiments, therefore, the driver 32 is offset in the cavity 44 in the axial direction F such that it is closer to the bottom of the cavity 44 than it is to the first flexible structure 50.

In preferred embodiments, the configuration of the actuator 18 is such that, when no voltage is applied to the piezoelectric driver 32, e.g. in the event of a failure of the device 10, the driver 32 adopts a relatively contracted state that causes the amplifier 40 to adopt a correspondingly contracted state that causes the contact 12 to be in the open state. It is further preferred that, during normal use, operating the actuator 18 to open the contacts 12, 14 involves applying a voltage to the driver 32 of a polarity that is the reverse of the polarity applied to close the contacts 12, 14. The reverse polarity voltage causes the driver 32 to contract more than when no voltage is applied, which causes the gap between the contacts 12, 14 to be wider under reverse bias than in the event of a failure of the device 10 and so improves the interrupter's interrupting capability.

The preferred amplifier 40 operates with relatively high force, speed, accuracy and repeatability by virtue of the following features:

1. The unequal thickness (and therefore stiffness) of the flexure bearings 66, 66'; 68, 68' in the two set S1, S2 stack design of the flexible structure 50 (and preferably also of the flexible structure 52) to re-distribute stress and maximise displacement. This keeps contact velocity and contact force high, while minimizing the size and weight of the amplifier 40.

2. The piezoelectric driver 32 is offset inside the body 42 of the amplifier 40 to compensate for the difference in motion of individual sections of the amplifier (caused by inertial effects). It provides space for the intermediate section 70 to move while avoiding or reducing the effect of contact with the driver 32, yet it minimises torque by keeping the flexure bearing 66, 66'; 68, 68' relatively close to the piezoelectric driver 32, which contributes to energy transmission efficiency.

3. Drift due to thermal expansion is compensated by using high CTE materials in a triangle shape to balance the negative CTE of the d33 axis of the driver 32, and low CTE materials for the amplifier itself.

In a typical embodiment, the above features allow the amplifier 40 to move the contact 12 by approximately 1.2 mm at approximately 2 ms$^{-1}$ (e.g. during interruption), with a repeatability of approximately 10 µs over thousands of operations.

Referring now to FIG. 3 in particular, the preferred vacuum interrupter 11 is described in more detail. At least one of, but preferably both of, the first and second contacts 12, 14 are incorporated into a respective contact assembly 82, 84 of which the respective contact 12, 14 provides the contact surface that engages with the other contact surface when the contacts 12, 14 are closed. Typically, the contacts 12, 14 comprise a disc or plate of any suitable electrically conductive material, usually a metal or metal alloy. In preferred embodiments, the contacts 12, 14 or at least the contact surfaces are formed primarily from tungsten carbide. The contacts 12, 14 may for example have a width or diameter of approximately 30 mm and a thickness of approximately 2 mm.

Each contact assembly 82, 84 further comprises a contact carrier 86, 88 which carries the respective contact 12, 14 at one end. The contact carrier 86, 88 is formed from an electrically conductive material, preferably copper or a copper alloy, e.g. copper-chromium-zirconium, and is electrically connected to the respective contact 12, 14 such that, in use, it forms part of the respective contact.

The carrier 86, 88 is a spring-like structure capable of resiliently compressing and decompressing along the contact movement axis A. To this end, the carrier 86, 88 preferably comprises a helical spring structure. The helical spring structure may comprise a continuous resilient helix but in the preferred embodiment comprises a body in which helical slots are formed to allow the body to function as a spring. In any event, the carrier 86, 88 acts as a compression spring whereby it compresses resiliently upon engagement of the contacts 12, 14 and decompresses during opening of the contacts 12, 14. In preferred embodiments, the carrier 86, 88 has a stiffness that over-damps the closing action of the contacts, although in other embodiments, some decompression may also occur as the contacts are closed depending on how the contact system is damped. The compressibility of the carrier 86, 88 reduces or eliminates contact bounce when the contacts 12, 14 close, which increases the longevity and reliability of the interrupter 11. Moreover, the arrangement is such that the carrier 86, 88 is held in a compressed state while the contacts 12, 14 are closed, and so when the contacts 12, 14 are opened, the resilience of the carrier 86, 88 urges the contacts 12, 14 apart, which increases the speed of contact opening. The preferred helical characteristic of the carrier 86, 88 causes the contact 12, 14 to rotate (slightly) about the axis A as the contacts 12, 14 open and close. This rotational movement is particularly advantageous when the contacts 12, 14 are being opened since it facilitates breaking any welds that may form between the contacts.

The carrier 86, 88 is hollow and, when electrically energised, generates an axial magnetic flux field which increases the axial magnetic flux density in the region of the contact assembly and in particular in the contacts 12, 14. This improves the interruption capacity of the interrupter 11.

To focus the axial magnetic flux density, in preferred embodiments a magnetic focussing element 90, 92 is located inside the carrier 86, 88. The magnetic focusing element 90, 92 typically comprises a block of ferromagnetic material, for example steel, preferably silicon steel (Fe—Si steel), or other ferrous material. The focussing element 90, 92 is dimensioned and located to leave a gap between itself and the contact 12, 14 when the carrier 86, 88 is in a relatively uncompressed state, but to contact the rear of the contact 12, 14 when the carrier 86, 88 is in a relatively compressed state, and in particular when the contacts 12, 14 are closed. When the focussing element 90, 92 is in contact with the contact 12, 14 the current flowing through the contact is divided between the focussing element 90, 92 and the carrier 86, 88 (in a typical embodiment approximately 30% of the current flows through the focussing element 90, 92 although this depends on what the carrier and focussing element are made of). During opening of the contacts 12, 14, the carrier 86, 88 decompresses and the contact between the focussing element 90, 92 is broken so that current no longer flows through the focussing element 90, 92 (instead it all flows through the carrier 86, 88). Advantageously, the arrangement is such that the contact between the focussing element 90, 92 is broken while the contacts 12, 14 are still in contact with one another during contact opening. This may be achieved through appropriate design of the relative dimensions of the carrier and the focussing element (particularly in the axial direction A) and of the stiffness of the carrier, which determines the speed at which it decompresses. Accordingly, at the moment when the contacts 12, 14 separate, all of the current flowing through the contact 12, 14 flows through the carrier 86, 88, which maximizes the axial magnetic flux density generated by the carrier 86, 88 during separation.

The focussing element 90, 92 amplifies the axial magnetic field generated by the carrier 86, 88 in the region of the contacts 12, 14 thereby further improving the interruption capacity of the interrupter 11.

When the focussing element 90, 92 is in contact with the contact 12, 14, the effect of the current flowing in the focussing element 90, 92 is to reduce inductive energy losses (core-loss) from the ferrous components, including the focusing element 90, 92.

In preferred embodiments, a magnetic shield 94 is provided around the contact assemblies 82, 84. The shield 94 preferably extends, around the axis A, around the entire periphery of the contact assemblies 82, 84, and typically comprises a sleeve-like structure. The shield 94 is located adjacent, but not in contact with, the outside surface of the carriers 86, 88, and preferably extends parallel with the outside surface of the carriers 86, 88. The shield 94 is formed from ferromagnetic material, for example steel, preferably low carbon steel or silicon steel (Fe—Si steel), or other ferrous material. Cold rolled grain oriented (CRGO) 3% Fe—Si steel is preferred.

The shield 94 provides a return path for the axial magnetic flux generated by the carriers 86, 88, the return path having a relatively low reluctance, i.e. a reluctance that is reduced in comparison to what it would be in the absence of the shield. The low reluctance increases the magnetic flux density in the interruption region around the contacts 12, 14 thereby further improving the interruption capacity of the interrupter 11. The shield 94 may therefore be said to act as a magnetic field condenser.

In preferred embodiments, the shield 94 is electrically connected to the second contact 14. Having the shield 94 at the same electrical potential as the contact helps to control the electric field in the vicinity of the contacts 12, 14 when the contacts break.

In typical embodiments, the contacts 12, 14, carrier 86, 88, focussing element 90, 92, and shield 94 are circular in longitudinal cross section. Alternatively, any one or more of these components may take any other shape as is convenient.

Any one or more of the contacts 12, 14, the focussing elements 90, 92, or the shield 94 may have one or more slots for reduction of eddy currents.

In preferred embodiments, the interrupter 11 significantly boosts interruption performance, without increasing the size or weight, by focusing the axial magnetic flux, additionally adding a low reluctance return path (magnetic condenser shield 94) to increase (typically by a factor of approximately 2.2) the flux in the interruption region. Advantageously, the gain provided by the shield 94 is selective, using cold rolled grain oriented (CRGO) 3% Si Fe steel to amplify only axial flux—with minimal gain in radial flux (which would cause Amperic motion of the columnar arc). Additionally, the CRGO steel suppresses eddy currents which would ordinarily produce a counter B-field.

As indicated above, it is desirable to reduce or eliminate contact bounce when the contacts 12, 14 close. For example, one of the biggest challenges when closing contacts in fault conditions is contact welding resulting from contact bounce; as the contacts collide at high speed, their hardness causes a ringing (small periodic separations) that can lead to arcing and melting of the contact surfaces. This problem is mitigated in preferred embodiments by the spring-like carriers 86, 88. Alternatively, or in addition, contact bounce can be mitigated by sinking mechanical energy generated in the piezoelectric driver 32 as a result of strain and/or stress in the driver 32 during contact engagement to an electrical load. Optionally, therefore electrodes may be connected to, preferably embedded in, the piezoelectric driver 42 and connected to an electrical load (not shown). Typically at least two electrodes are provided, preferably multi-terminal electrodes. In preferred embodiments where multi-terminal electrode(s) are used, it is preferred that the terminals are spaced apart along the length of the piezoelectric driver (preferably in the direction of the expansion axis EA), and, where both the electrodes have multiple terminals, it is preferred that the respective terminals are interleaved with one another (e.g. as illustrated in FIGS. 9B and 9C).

Conveniently, the electrodes 34, 36 that are used to apply voltages to the piezoelectric driver 32 may also be used to sink the excess mechanical energy. This may be achieved by connecting the electrodes 34, 36 to a switching device (not shown) that can selectively connect them to a power source (not shown) or an electrical load (not shown). The switching device is operated (by any conventional controller (not shown)) to connect the electrodes 34, 36 to the power source to supply a suitable voltage to the piezoelectric driver 32 when it is desired to operate the actuator 18 to move the contact 12, and to connect the electrodes 34, 36 to the electrical load when it is desired to sink energy from the driver 32 to mitigate contact bounce.

Figure 9A:
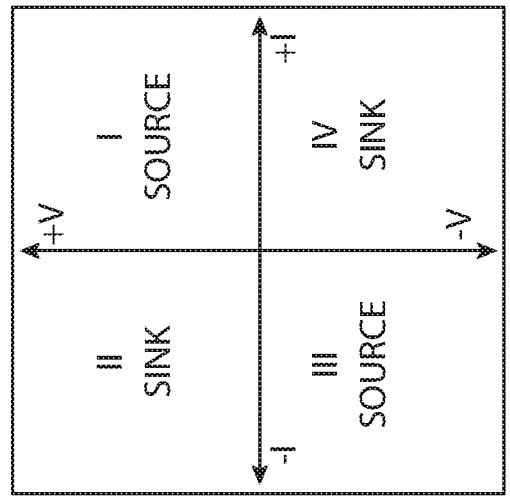
FIG. 9A is a graph illustrating voltage and current energising modes for the piezoelectric element of the piezoelectric actuator of FIG. 4.

In preferred embodiments, this is achieved by connecting the electrodes 34, 36 to a power supply that is capable of acting as either a power supply (source) or a load (sink). Conveniently, a bipolar, or four quadrant, power supply is used for this purpose, which can produce either positive or negative voltage at its output terminals. As shown in FIG. 9A, a bipolar, or four quadrant, power supply is capable of operating in any one of four quadrants determined by the polarity of the voltage and current at its terminals. In quadrants I and III, the bipolar supply is sourcing power: current flows out of the more positive voltage terminal. In quadrants II and IV, the bipolar supply is consuming power (acting as a load): current flows into the more positive voltage terminal. Hence, the bipolar power supply is operated by the controller to act as a power supply or a load depending on whether it is desired to operate the actuator 18 to move the contact 12, or to sink energy from the driver 32 to mitigate contact bounce.

In preferred embodiments therefore the piezoelectric driver 32 mitigates contact bounce using a four quadrant power supply to source and sink current as required. FIG. 9B illustrates the operation of the power supply when acting as a power source to close the contacts: a voltage is applied to the piezoelectric driver 32 to cause the driver 32 to contract along its expansion axis d33 by the inverse piezoelectric effect thereby causing the amplifier 40 to close the contacts. Subsequently, the power supply is operated to sink the energy in the driver 32, as illustrated in FIG. 9C: a stress wave, with a wavelength significantly shorter than the length of the piezoelectric driver 32, travels from its generation at the impacting surface of contact 12, through the amplifier 40 and into the driver 32. Once it is inside the piezoelectric driver 32, the piezoelectric material converts this stress-strain energy into electrical potential (by the piezoelectric effect), which is extracted by the electrodes 34, 36. In a typical embodiment there may be hundreds of electrode terminals embedded in the piezoelectric material for this purpose. Since the length of the piezoelectric driver 32 is considerably longer than the pressure wave's wavelength (required to generate the large displacement needed for the interrupter), it has a very high coupling efficiency. The four quadrant supply provides means by which this energy can be extracted as current, and dissipated by Ohmic heating ($I^2R$).

In preferred embodiments, at least one of the contacts 12, 14 (preferably the movable contact 12) is formed from a primary refractory material (e.g. tungsten carbide copper in preferred embodiments) and a secondary refractory material that serves as a non-evaporable getter. The primary refractory material may be coated with or otherwise combined, e.g. mixed, with the second refractory material in any conventional manner. For example, the secondary refractory material in powder form may be added to a sinter mix with the primary refractory material, the sinter mix being used to form the contact by any conventional sintering process. The secondary refractory material may be any material that acts as a getter within the vacuum chamber 16. In preferred embodiments, the secondary refractory material comprises titanium, although other metals, especially non-volatile metals e.g. chromium, may be used instead or in addition. The secondary refractory material may be present at approximately 5%-20%, preferably approximately 10%, of the material forming the, or each, contact.

By way of example, in preferred embodiments, powdered titanium is added to the sinter mix with the primary refractory material and typically also an infiltration metal such as copper or silver. The contact 12, 14 may for example be formed using a press-sinter-infiltrate or press-sinter-press process.

During the interruption process, i.e. opening the contacts 12, 14, the contact surfaces are ablated causing quantities of material, including the second refractory material, to be removed from the contact surfaces and deposited on other surfaces in the vacuum chamber (e.g. the other contact 14, 12, and in preferred embodiments the inner surface of the shield 94). The deposited secondary refractory material, acting as a getter, is a reactive material that combines chemically with or absorbs gases that are present in the vacuum chamber 16 as a result of the operation of the interrupter 11. In so doing, the deposited second refractory material helps to maintain the vacuum in the chamber 16 thereby extending the operational lifetime of the interrupter.

Figure 8:
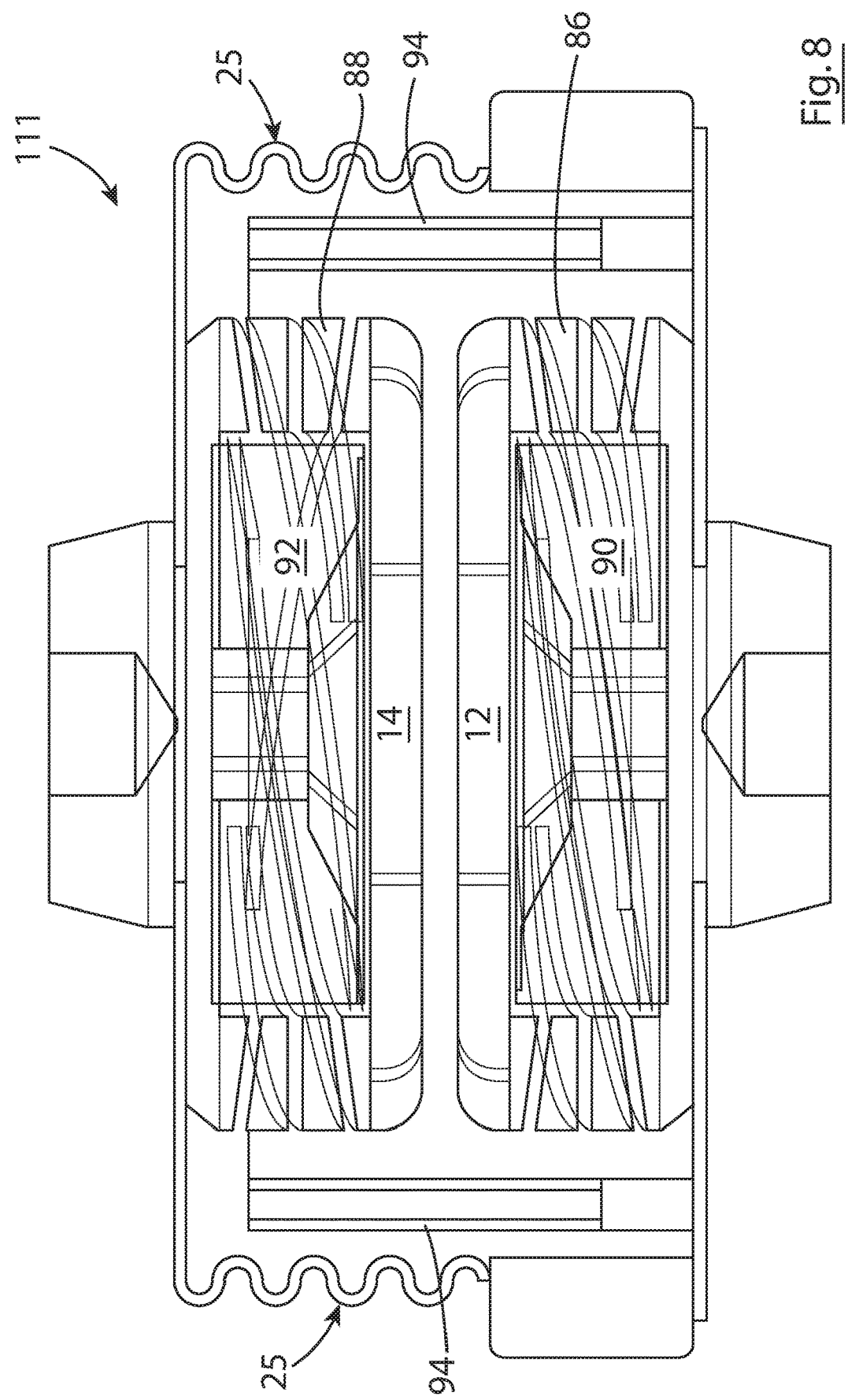
FIG. 8 is a sectional side view of an embodiment of the vacuum interrupter being suitable for use with other actuators.

Referring now to FIG. 8, it is noted that vacuum interrupters embodying one aspect of the present invention can be used in other applications, not necessarily with the piezoelectric actuator 18. The vacuum interrupter 111 is similar to the vacuum interrupter 11, the same numerals being used to denote like parts and the same or similar description applying as would be apparent to a skilled person. The vacuum interrupter 111 may be coupled to any conventional actuator, for example an electromagnetic actuator with bellows coupling device (not shown). Optionally, the housing 24 of the interrupter 111 is compressible, e.g. by means of a bellows portion 25, to facilitate movement of the contact 12 with respect to the contact 14.

The invention is not limited to the embodiment(s) described herein but can be amended or modified without departing from the scope of the present invention.

The invention claimed is:

1. A vacuum circuit breaker comprising a vacuum interrupter operable between a closed state and an open state, and an actuator, wherein said actuator comprises a piezoelectric driver that is expandable and contractable along an expansion axis in response to an electrical input signal, and wherein said actuator further comprises a mechanical amplifying structure extendable along an actuation axis and being mechanically coupled to said piezoelectric driver such that expansion or contraction of said piezoelectric driver causes said amplifying structure to extend or retract along said actuation axis, said mechanical amplifying structure being coupled to said vacuum interrupter for operating said vacuum interrupter between said closed and open states, wherein said amplifying structure comprises a body shaped and dimensioned to define a cavity in which said piezoelectric driver is located, said body having a flexible structure extending between first and second sides of said body defining a top of said cavity, said flexible structure being flexible in a direction of said actuation axis to effect extension and contraction of said actuator, wherein the flexible structure comprises first and second sets of first and second rigid segments, each segment of said first and second rigid segments having a respective one end coupled to a respective one of said first and second sides by a respective hinge, a respective other end of each segment being coupled together by an intermediate segment that allows said first and second segments to pivot with respect to each other about an axis that runs parallel with said first and second sides, wherein said first and second sets of first and second rigid segments are stacked such that said first set of said first and second rigid segments is located between said second set of said first and second rigid segments and the cavity, and wherein the respective hinge that couples the respective one end of the respective first and second segments of the second set to the respective first or second side is stiffer than the respective hinge that couples the respective one end of the respective first and second segments of the first set to the respective first or second side.

2. The vacuum circuit breaker of claim 1, wherein said body is sleeve shaped.

3. The vacuum circuit breaker as claimed in claim 1, wherein said first and second sides are movable with respect to each other in a transverse direction, said flexible structure being configured to flex in the direction of said actuation axis in response to relative movement of said first and second sides in said transverse direction, and wherein said first and second sides are movable by expansion and contraction of said piezoelectric driver in said transverse direction.

4. The vacuum circuit breaker of claim 1, wherein each hinge of said respective hinges comprises a flexure bearing.

5. The vacuum circuit breaker of claim 1, wherein said intermediate segment comprises a structure to which the respective other end of each of the first and second segments is coupled by a respective hinge comprising a flexure bearing.

6. The vacuum circuit breaker as claimed in claim 1, wherein said intermediate segment forms part of a coupling between said actuator and said vacuum interrupter for operating the vacuum interrupter.

7. The vacuum circuit breaker as claimed in claim 1, wherein, the respective other end of each segment of each set is coupled to a common intermediate segment.

8. The vacuum circuit breaker of claim 1, wherein each hinge of said respective hinges comprises a respective flexure bearing, the respective flexure bearing of said second set being thicker than the respective flexure bearing of said first set.

9. The vacuum circuit breaker of claim 1, wherein said flexible structure comprises a first flexible structure, and said body has a second flexible structure extending between first and second sides of the body defining a bottom of said cavity.

10. The vacuum circuit breaker of claim 1, wherein said piezoelectric driver is located in said cavity such that a gap is defined between said piezoelectric driver and said flexible structure, the piezoelectric driver being offset in the cavity in the direction of the actuation axis such that the piezoelectric driver is closer to a bottom of the cavity than to the flexible structure.

11. The vacuum circuit breaker of claim 1, wherein a thermal compensating component is provided at each of said first and second sides for engaging with the piezoelectric driver.

12. The vacuum circuit breaker as claimed in claim 1, comprising a housing in which said actuator and vacuum interrupter are located, wherein the actuator is coupled to the vacuum interrupter by a flexible coupling member that extends across the housing between the actuator and the vacuum interrupter, the actuator being coupled to the flexible member such that extension and contraction of the actuator causes the flexible member to flex correspondingly along said actuation axis, and wherein the flexible coupling member is non-resilient.

13. The vacuum circuit breaker of claim 12 wherein said vacuum interrupter comprises first and second electrical contacts, said first electrical contact being movable with respect to said second electrical contact to effect said open and closed states, wherein said flexible coupling member is electrically connected to the first electrical contact, and wherein said actuator is electrically isolated from the flexible member.

14. The vacuum circuit breaker of claim 1, wherein said vacuum interrupter comprises first and second electrical contacts, said first electrical contact being movable with respect to said second electrical contact to effect said open and closed states, at least one of or both of, the first and second electrical contacts being incorporated into a respective contact assembly of which a respective electrical contact provides a contact surface that engages with the contact surface of the other respective electrical contact when the electrical contacts are in the closed state, the respective contact assembly further comprising a contact carrier which carries the respective electrical contact at one end, the contact carrier being formed from an electrically conductive material and being electrically connected to the respective electrical contact and comprising a hollow structure, wherein said hollow structure is a spring structure capable of resiliently compressing and decompressing along the contact movement axis.

15. The vacuum circuit breaker of claim 14, wherein a magnetic focussing element is located inside the said hollow structure, the magnetic focusing element comprising a block of ferromagnetic material, wherein the focussing element is dimensioned and located to leave a gap between the focusing element and the respective electrical contact when the contact carrier is in a relatively uncompressed state, and to contact the respective electrical contact when the contact carrier is in a relatively compressed state, and the relatively compressed state caused by engagement of said first and second electrical contacts, and wherein said contact carrier is configured to adopt said relatively uncompressed state during opening of said first and second electrical contacts before said first and second electrical contacts are separated.

16. The vacuum circuit breaker as claimed in claim 14, wherein a magnetic shield is provided around the or each contact assembly, said shield comprising a sleeve structure formed from a ferromagnetic material, the shield being electrically connected to one or other of said electrical contacts.

17. The vacuum circuit breaker as claimed in claim 1, wherein at least two electrodes are embedded in said piezoelectric driver, said at least two electrodes comprise multiple terminals arranged such that the terminals are spaced apart along a length of the piezoelectric driver in the direction of the expansion axis, and wherein said at least two electrodes comprise first and second electrodes each having multiple terminals, the multiple terminals of the first electrode being interleaved with the multiple terminals of the second electrode, and wherein said at least two electrodes are connected, or are connectable, to an electrical power supply for applying said electrical input signal to said piezoelectric driver or to an electrical load for sinking energy generated in said piezoelectric driver by a piezoelectric effect.

18. The vacuum circuit breaker as claimed in claim 1, wherein said vacuum interrupter comprises first and second electrical contacts, at least one of said electrical contacts being formed from a primary refractory material and a secondary refractory material capable of acting as a non-evaporable getter, and wherein the secondary refractory material comprises titanium.

\* \* \* \* \*